US010169590B2

United States Patent

(12) United States Patent
Xiang et al.

(10) Patent No.: US 10,169,590 B2
(45) Date of Patent: *Jan. 1, 2019

(54) APPARATUS AND METHOD FOR DISPLAYING COMPUTER HEALTH INDEX

(71) Applicant: BEIJING QIHOO TECHNOLOGY COMPANY LIMITED, Beijing (CN)

(72) Inventors: Ming Xiang, Beijing (CN); Sheng Ou, Beijing (CN); Ruiqi Wang, Beijing (CN); Hao Chen, Beijing (CN); Shengyi Shi, Beijing (CN); Jianhua Wu, Beijing (CN); Rixin Gao, Beijing (CN)

(73) Assignee: Beijing Qihoo Technology Company Limited, Beijing (CN)

( * ) Notice: Subject to any disclaimer, the term of this patent is extended or adjusted under 35 U.S.C. 154(b) by 12 days.

This patent is subject to a terminal disclaimer.

(21) Appl. No.: 15/493,963

(22) Filed: Apr. 21, 2017

(65) Prior Publication Data

US 2017/0228545 A1 Aug. 10, 2017

Related U.S. Application Data

(63) Continuation of application No. 14/405,856, filed as application No. PCT/CN2013/076456 on May 30, 2013, now Pat. No. 9,633,208.

(30) Foreign Application Priority Data

Jun. 7, 2012 (CN) .......................... 2012 1 0187219

(51) Int. Cl.

| | |
|---|---|
| ***G06F 21/57*** | (2013.01) |
| ***G06F 21/74*** | (2013.01) |
| ***G06F 11/32*** | (2006.01) |

(52) U.S. Cl.

CPC .......... *G06F 21/577* (2013.01); *G06F 11/328* (2013.01); *G06F 21/74* (2013.01); *G06F 2221/034* (2013.01)

(58) Field of Classification Search

CPC combination set(s) only.
See application file for complete search history.

(56) References Cited

U.S. PATENT DOCUMENTS 5,024,225 A * 6/1991 Fang ...................... A61B 5/044 174/50
6,754,664 B1 * 6/2004 Bush ...................... H04L 29/06
(Continued)

OTHER PUBLICATIONS

International Search Report regarding PCT/CN20131076456 dated Sep. 5, 2013, 3 pages.
(Continued)

*Primary Examiner* — Phy Anh Vu
(74) *Attorney, Agent, or Firm* — Polsinelli PC

(57) ABSTRACT

The disclosure discloses an apparatus for displaying a computer health index comprising: a memory having instructions stored thereon; a processor to execute the instructions to perform operations comprising: calculating at least one health sub-index, and calculating the computer health index based on the at least one health sub-index, wherein each health sub-index is associated with at least one computer state, and each health sub-index reflects a health degree of an associated computer state; and performing simple index display to display a small icon reflecting a value of the computer health index in a simple index display area.

11 Claims, 8 Drawing Sheets

(56) References Cited

U.S. PATENT DOCUMENTS 7,519,909 B2 4/2009 Kuiawa et al.
7,584,075 B2* 9/2009 Kim .................... G01H 9/004 340/870.15
7,668,696 B2* 2/2010 Gross .................... G06F 11/30 702/185
7,698,239 B2* 4/2010 Lieuallen .................... H04L 43/50 706/16
7,792,922 B2* 9/2010 Purcell .................... G06F 11/30 707/999.01
8,667,123 B2* 3/2014 Orton .................... H04L 12/40 370/242
2002/0174367 A1* 11/2002 Kimmel .................... G08B 13/19 726/4
2002/0184055 A1 12/2002 Naghavi et al.
2003/0050538 A1 3/2003 Naghavi et al.
2004/0222977 A1* 11/2004 Bear .................... G06F 11/328 345/184
2005/0097480 A1* 5/2005 Care .................... G06F 3/0481 715/859
2005/0114502 A1* 5/2005 Raden .................... G06F 11/3006 709/224
2005/0131997 A1* 6/2005 Lewis .................... G06F 21/552 709/203
2006/0026283 A1* 2/2006 Trueba .................... G06F 21/577 709/225
2006/0112314 A1* 5/2006 Soto .................... G06F 11/0709 714/38.14
2008/0077603 A1* 3/2008 Arnott .................... G06F 21/577
2008/0115218 A1* 5/2008 Jeffries .................... G06F 11/328 726/25
2008/0134046 A1* 6/2008 Gray .................... G06F 11/328 715/736
2008/0229422 A1* 9/2008 Hudis .................... G06F 21/552 726/25
2008/0244724 A1* 10/2008 Choe .................... G06F 21/33 726/12
2008/0313632 A1* 12/2008 Kumar .................... G06F 9/44505 718/100
2009/0064143 A1* 3/2009 Bhogal .................... G06F 9/542 718/100
2009/0064284 A1* 3/2009 Poston .................... G06F 21/6218 726/4
2009/0070699 A1* 3/2009 Birkill .................... G06F 3/0481 715/772
2009/0292580 A1 11/2009 Cross et al.
2010/0111263 A1 5/2010 Lamberty
2010/0250430 A1* 9/2010 Ariff .................... G06Q 40/00 705/38
2011/0039237 A1* 2/2011 Skare .................... G05B 23/0267 434/118
2011/0137678 A1* 6/2011 Williams .................... G06Q 50/22 705/3
2011/0314543 A1* 12/2011 Treit .................... G06F 21/577 726/23
2012/0072780 A1* 3/2012 Kini .................... G06F 11/3466 714/47.2
2013/0179461 A1* 7/2013 Sharma .................... G06F 11/3055 707/769
2015/0026428 A1* 1/2015 Bobroff .................... G06F 12/0253 711/170
2015/0248844 A1* 9/2015 Ellis .................... A61B 5/1038 434/247
2015/0302204 A1* 10/2015 Wan .................... G06F 21/577 726/25
2016/0054710 A1 2/2016 Jo et al.
2016/0350539 A1* 12/2016 Oberheide .................... G06F 21/577

OTHER PUBLICATIONS

English translation of abstract only of Chinese application CN102439568 A, Title: System health and performance care of computing devices, Publication Date: May 2, 2012, Country: CN, Inventor(s): Robert Cowie, et al., one page.

* cited by examiner 210
220

Desktop Application

Desktop Application

APPARATUS AND METHOD FOR DISPLAYING COMPUTER HEALTH INDEX

CROSS-REFERENCE TO RELATED APPLICATIONS

This application is a continuation of application Ser. No. 14/405,856, filed on Mar. 26, 2015, which is the National Stage of International Application No. PCT/CN2013/076456 filed on May 30, 2013, which claims the benefit of Chinese Patent Application No. 201210187219.8 filed Jun. 7, 2012, the disclosures of which are incorporated herein by reference in their entireties.

FIELD OF THE INVENTION

The disclosure relates to the field of computer technology, and in particular, to a method and apparatus for displaying a health index representative of a computer health state on a computer desktop.

BACKGROUND OF THE INVENTION

With the increasing development of computer and internet technologies, more and more users rely on computers to complete their daily work, and what is followed is that more and more malicious programs such as computer viruses, Trojans, etc. also began to invade users' computers, try to destroy data that users have stored on computers, and illegally obtain users' sensitive data, and so on, which has caused serious losses to users. For this reason, nowadays there also arise various anti-virus software and security applications, which may help users to prevent the invasion of these malicious programs.

In the course of using a computer, a user generally needs to have a comprehensive understanding of the health state of his computer. The computer health involves multiple aspects of the computer, for example, whether various security patches of the computer have already been updated timely, whether the firewall settings of the computer are reasonable, whether junk files in the computer have been cleaned up timely, and whether various system sources of the computer are excessively occupied, and the like. In general, the health state of a computer depends on the security settings of the computer, the performance of the computer and/or the cleanup state of junk files of the computer, etc. At present, there have already been a variety of methods, which calculate the overall health state of a computer based on a variety of settings of the computer, and display the overall health state to a user of the computer. Most current solutions will show a small icon concerning a computer health state at the bottom right corner of a desktop of a user, and if the user clicks the small icon, the system will display detailed information about the computer health state.

However, since the location where the small icon is does not belong to an area which the user focuses on, the user will often forget to click the small icon to display the health state of the computer, such that the user does not timely updates the settings concerning the computer health, which leads to the risk that the user's computer may be invaded maliciously to increase. Therefore, there is a need for a solution which displays the computer health state in a manner capable of sufficiently drawing the user's attention, thereby prompting the user to timely update the computer health settings, to keep the computer in a healthiest state.

SUMMARY OF THE INVENTION

In view of the above problems, the disclosure is proposed to provide a method and apparatus for displaying a computer health index which overcome the above problems or at least in part solve or mitigate the above problems.

According to an aspect of the disclosure, there is provided an apparatus for displaying a computer health index comprising: a memory having instructions stored thereon; a processor to execute the instructions to perform operations comprising: calculating at least one health sub-index, and calculating the computer health index based on the at least one health sub-index, wherein each health sub-index is associated with at least one computer state and each health sub-index reflects a health degree of an associated computer state; and performing simple index display to display a small icon reflecting a value of the computer health index in a simple index display area.

According to another aspect of the disclosure, there is provided a method for displaying a computer health index comprising: calculating, by at least one processor, at least one health sub-index, and the computer health index based on the at least one health sub-index, wherein each health sub-index is associated with at least one computer state and each health sub-index reflects a health degree of an associated computer state; and performing, by at least one processor, simple index display to display a small icon reflecting a value of the computer health index in a simple index display area.

According to yet another aspect of the disclosure, there is provided a non-transitory computer readable medium having instructions stored thereon that, when executed by at least one processor, cause the at least one processor to perform operations for displaying the computer health index, the operations comprising: calculating at least one health sub-index and calculating the computer health index based on the at least one health sub-index, wherein each health sub-index is associated with at least one computer state and each health sub-index reflects a health degree of an associated computer state; and performing simple index display to display a small icon reflecting a value of the computer health index in a simple index display area.

The beneficial effects of the disclosure lie in that:

The method for displaying the computer health index according to the disclosure will in general display a small icon on a computer desktop, the appearance of the small icon will change with the computer health index, and such change of the small icon will draw a user's sufficient attention, such that the user may set the computer states upon focusing on the change of the small icon, to improve the health degrees of the computer states, thereby promoting the overall security of the computer.

In addition, since a detailed index display may be triggered in a simple index display area to display in greater detail the computer health index and each of the health sub-indices constituting the computer health index, upon focusing on the change of the small icon, the user may easily trigger a detailed index display by, for example, simply clicking an area located on or near the small icon, to display specific information on the computer health, such that it may be conveniently known which state(s) of the user's computer has or have a health problem(s), and setting may be performed for these states to improve the health degrees of the computer states, thereby promoting the overall security of the computer.

The apparatus and method for displaying the computer health index according to the disclosure provide a computer health state display mechanism which easily draws a user's attention and facilitates the user to perform health setting, such that the user may conveniently set the computer states to have high health degrees, thereby promoting the overall security of the computer.

The above description is merely an overview of the technical solutions of the disclosure. In the following particular embodiments of the disclosure will be illustrated in order that the technical means of the disclosure can be more clearly understood and thus may be embodied according to the content of the specification, and that the foregoing and other objects, features and advantages of the disclosure can be more apparent.

BRIEF DESCRIPTION OF THE DRAWINGS

Various other advantages and benefits will become apparent to those of ordinary skills in the art by reading the following detailed description of the preferred embodiments. The drawings are only for the purpose of showing the preferred embodiments, and are not considered to be limiting to the invention. And throughout the drawings, like reference signs are used to denote like components. In the drawings:

FIG. 1 shows schematically a block diagram of an apparatus for displaying a computer health index according to an embodiment of the disclosure;

FIGS. 2-8 show schematically a desktop display state of the apparatus for displaying the computer health index according to an embodiment of the disclosure.

DETAILED DESCRIPTION OF THE INVENTION

In the following the invention will be further described in connection with the drawings and the particular embodiments.

Figures 1, 2:
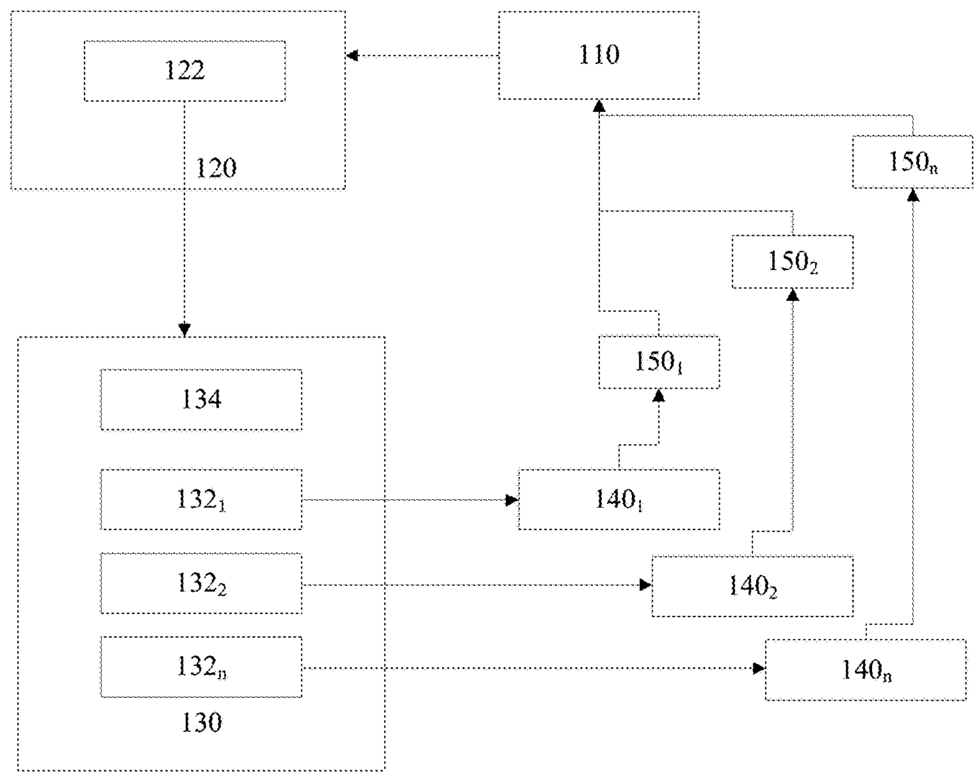

FIG. 1 shows schematically a block diagram of an apparatus for displaying a computer health index 100 according to an embodiment of the disclosure. As shown in FIG. 1, the apparatus for displaying the computer health index 100 comprises a health index calculator 110 and a simple index display 120.

The health index calculator 110 may calculate a computer health index reflecting the overall health state of a computer. The overall health state of a computer is associated with one or more computer states $\mathbf{150}_1$, $\mathbf{150}_2$ and $\mathbf{150}_n$ of the computer itself. As an example, a computer state such as the security settings of the computer itself, the condition in which the computer resources are used, and how much junk files there are in the computer, and so on, reflects more or less the health state of the computer. Optionally, it may be possible to classify individual states of the computer, set a health sub-index of a corresponding class for the computer states of each class, and totally calculate the computer health index based on the individual health sub-indices.

The classes of computer states may comprise the computer security firewall state $\mathbf{150}_1$, the computer performance state $\mathbf{150}_2$ and/or the computer cleanup state $\mathbf{150}_n$, etc.

The computer security firewall state $\mathbf{150}_1$ relates to various computer protection settings, for example, the webpage security protection setting, the chat security protection setting, the download security protection setting, the U disk security protection setting, the hacker intrusion protection setting, the file system protection setting, the driver protection setting, the process protection setting, and/or the registry protection setting, etc. Each kind of protection setting significantly affects the health state of the computer, whether it is opened or not.

In an implementation of the disclosure, when all the protection settings of a computer security firewall are opened, the health sub-index $I_1$ corresponding to the computer security firewall state $\mathbf{150}_1$ is set to be 100%; when there is one protection setting that is closed, the corresponding health sub-index $I_1$ is set to be 50%; and when there are two or more protection settings that are closed, the corresponding health sub-index $I_1$ is set to be 10%. It should be appreciated that the above-mentioned setting about the health sub-index $I_1$ is just one instance, and according to the instance, the skilled in the art may absolutely conceive various other setting modes without the need for any creative effort.

The computer performance state $\mathbf{150}_2$ relates to a state in which various resources of the computer are used, and the more the resources of the computer are used, it reflects that the worse the health state of the computer is. The various resources of the computer may comprise the computer memory, the storage space, the network bandwidth, etc.

In an implementation of the disclosure, the health sub-index $I_2$ corresponding to the computer performance state $\mathbf{150}_2$ is set according to the condition in which the computer memory is used. For example, when the memory usage is lower than 50%, the corresponding health sub-index $I_2$ is set to be 100%, whereas when the memory usage is greater than 50%, each time the memory usage is increased by 1%, the health sub-index $I_2$ is decreased by 3%, until the corresponding health sub-index $I_2$ is set to be 10%. It will be appreciated that the above-mentioned setting about the health sub-index $I_2$ is just one instance, and according to the instance, the skilled in the art may absolutely conceive various other setting modes without the need for any creative effort. For example, the skilled in the art may further consider other use conditions of the computer resources, e.g., the extent to which the network bandwidth is used, etc., all of which are within the protection scope of the invention.

The computer cleanup state $\mathbf{150}_n$ relates to a state in which various junk files in the computer are cleaned up. In general, in the course of use, the computer will generate some junk files under some directories, and in addition to occupying the storage space, these junk files might also have malicious content, and therefore whether or not these can be timely cleaned up will also affect the health state of the computer.

In an implementation of the disclosure, the health sub-index $I_3$ corresponding to the computer cleanup state $\mathbf{150}_n$ is set according to the time span from the latest point that the computer cleaned up the junk files. For example, if the time span from the latest point that the computer cleaned up the junk files is no more than 24 hours, the health sub-index $I_3$ is set to be 100%, and subsequently, the health sub-index $I_3$ is lowered by 1% every one hour, until the health sub-index $I_3$ is 10%. It should be noted that the above-mentioned setting about the health sub-index $I_3$ is just one instance, and according to the instance, the skilled in the art may absolutely conceive various other setting modes without the need for any creative effort.

After calculating the health sub-indices $I_1$, $I_2$ and $I_3$ of various computer states, the health index calculator 110 may calculate the overall health index according to these health sub-indices. There may be many methods of calculating the overall health index I, for example, the overall health index I may be simply calculated by taking the average of these health sub-indices, namely, $I=(I_1+I_2+I_3)/3$. Optionally, considering that effects of different kinds of computer states on the overall health state of the computer are different, the overall health index I may thus be calculated as a weighted sum of the individual health sub-indices, namely, $I=W_1\times I_1+W_2\times I_2+W_3\times I_3$. For example, in an implementation of the disclosure, $W_1$ may be set to be 60%, and $W_2$ and $W_3$ may be set to be 20%, respectively. It will be appreciated by the skilled in the art that these modes of calculating the overall health index according to the health sub-indices are all within the protection scope of the invention, and according to the above revelation, the skilled in the art may envisage many other calculating modes without departing from the protection scope of the invention.

The simple index display 120 may receive the computer health index from the health index calculator 110, and display a small icon reflecting a value of the computer health index. The simple index display 120 generally displays the small icon in a specific area on the desktop. FIG. 2 shows schematically a desktop display state according to an embodiment of the disclosure. In FIG. 2, the small icon 210 about the computer health index is displayed on a navigation map bar on the top of the screen, and as such, although the size of the small icon is very small, its change will easily be noticed by the user.

Figures 3, 4:
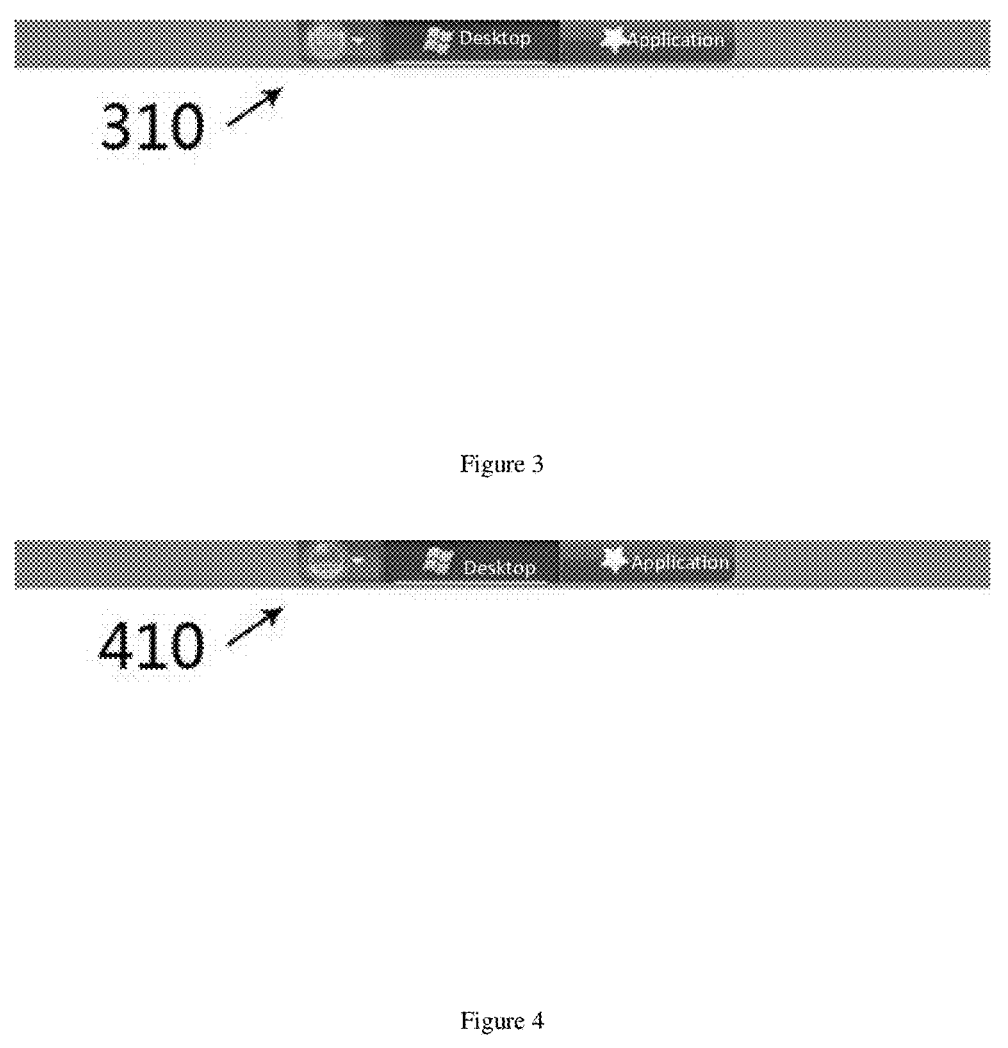

The appearance of the small icon may change with the value of the computer health index, thereby drawing the user's attention. For example, when the value of the computer health index is low, the small icon is displayed in a more prominent mode, whereas as the value of the computer health index becomes higher and higher, the display mode of the small icon will be increasingly soft. In an implementation of the disclosure, the color of the small icon may change with the value of the computer health index, and the higher the value of the health index, the more greenish the color is, whereas the lower the value of the health index, the reddish the color is. In another implementation of the disclosure, the appearance of the small icon is displayed as a sphere, the filling amount of the sphere changes with the value of the health index, and the higher the value of the health index, the more full the filling amount is. FIGS. 3 and 4 respectively show that the appearance of the small icons 310 and 410 changes with the value of the health index, and in FIGS. 3 and 4, both the small icons 310 and 410 are shown to be a sphere having a certain filling amount. In FIG. 3, the value of the health index of the computer is relatively high, and at this point, the filling amount of the small icon 310 is relatively high, whereas in FIG. 4, the value of the health index of the computer is relatively low, and at this point, the filling amount of the small icon 410 is also relatively low. In addition, in an implementation of the disclosure, when the value of the health index is the largest (e.g., 100%), the small icon displayed by the simple index display 120 is a fixed icon. Thus, when there is no need for improving the health state of the computer by optimizing the computer, the user will not be disturbed by the change of the small icon and get used to the display mode of the small icon. In FIG. 2, the display appearance 210 of the small icon when the value of the health index is the largest is already shown.

It is to be noted that, a plurality of instances about the display modes in which the simple index display 120 displays the small icon are given above, and these display modes may be used respectively or in combination. For example, while the color of the small icon changes, its shape may also change. The display mode in which the simple index display 120 displays the small icon is not limited to the above-mentioned specific display modes, and all the display modes in which the display appearance of the small icon may be changed according to the value of the health index are all within the protection scope of the invention.

The simple index display 120 may further comprise a trigger 122, and when the trigger 122 is triggered, it causes the apparatus for displaying the computer health index 100 to activate a detailed index display 130 to display detailed information on the computer health index. The trigger 122 may be triggered utilizing multiple modes, for example, the simple index display 120 may show a trigger region (e.g., the region as shown by 220 in FIG. 2) in an area proximate to the small icon, and as long as the user clicks on the trigger region, the trigger 122 may be triggered. Optionally, the trigger region may coincide with the small icon, for example, as long as the user clicks on the small icon, the trigger 122 may be triggered. The skilled in the art may envisage other trigger modes without departing from the protection scope of the disclosure.

Upon activation, the detailed index display 130 may receive from the health index calculator 110 the computer health index I and one or more health sub-indices $I_1$, $I_2$ and $I_3$, and display in another specific area on the desktop information on the computer health index I as well as information on each of the one or more health sub-indices $I_1$, $I_2$ and $I_3$.

In general, the display area A2 of the detailed index display 130 on the desktop is adjacent to the display area A1 of the simple index display 120, and the display area A2 is much larger than A1, therefore, according to an embodiment of the disclosure, A2 is generally shown under A1, such that when the detailed index display 130 is triggered, the display of the display area A2 has the effect of a pop-up window.

Figure 5:
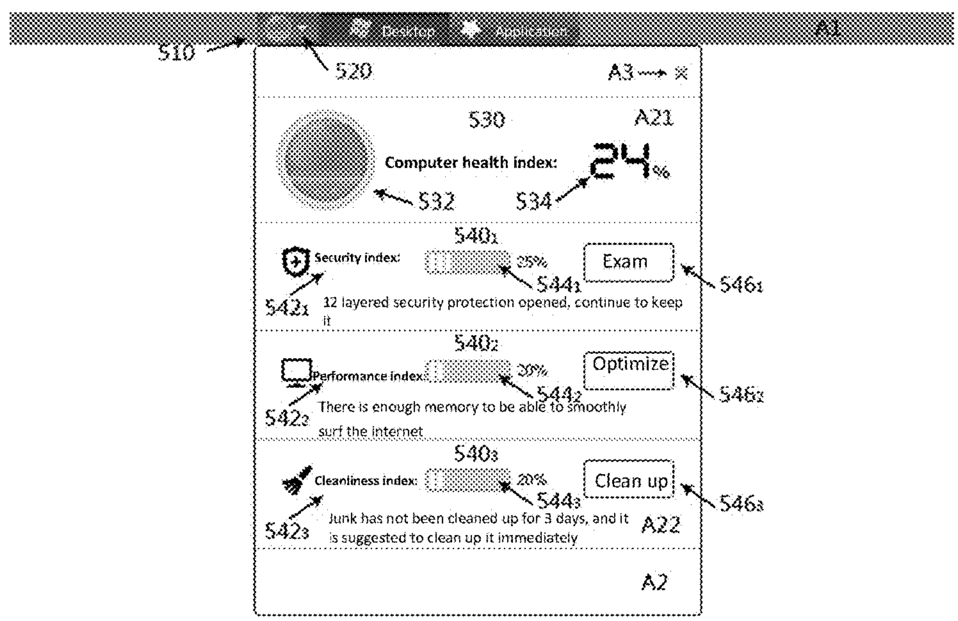

FIG. 5 shows the display effect after the detailed index display 130 is triggered. As shown in FIG. 5, in the display area A1, there are comprised the small icon 510 displayed by the simple index display 120 and the trigger region 520. Under the display area A1, there is a larger display area A2. The display area A2 may comprise two display sub-areas A21 and A22. In the display area A21, there is comprised information 530 on the computer health index I, whereas in the display area A22, there is comprised information 540$_1$, 540$_2$ and 540$_3$ on a computer state associated with each health sub-index $I_1$, $I_2$ and $I_3$.

When displaying the information 530 on the computer health index I, the detailed index display 130 may display a large icon 530 reflecting the value of the computer health index and the value 534 of the computer health index. The display mode of the large icon 532 may be similar to that of the small icon, and the difference may lie in that the size of the large icon 532 will be clearly larger than that of the small icon.

When displaying information 540$_1$, 540$_2$ and 540$_3$ on a computer state associated with each health sub-index $I_1$, $I_2$ and $I_3$, the detailed index display 130 may display the information 542$_1$, 542$_2$ and 542$_3$ on the computer state associated with each health sub-index $I_1$, $I_2$ and $I_3$, as well as the information 544$_1$, 544$_2$ and 544$_3$ on the values of the health sub-indices.

As shown in FIG. 5, the information 542 on the computer states may comprise the description of the computer states, for example, the "security index" 542$_1$, the "performance index" 542$_2$ and the "cleanliness index" 542$_3$ as shown in FIG. 5. The information 544 on the values of the health sub-indices may comprise power state bars $544_1$, $544_2$ and $544_3$ shown similarly to the form of indicating the state of a power source.

It should be noted that, the disclosure is not restricted to the above display mode, and as long as the user may obtain detailed information on the computer health index according to the display content of the detailed index display 130, such a display mode is within the protection scope of the invention.

In addition, the detailed index display 130 further comprises one or more computer state setting triggers $132_1$, $132_2$ and $132_n$. Each of the computer state setting triggers $132_1$, $132_2$ and $132_n$ is associated with one corresponding computer state setter $140_1$, $140_2$ and $140_n$, and when each computer state setting trigger is triggered, a corresponding computer state setter $140_1$, $140_2$ and $140_n$ is started to set one or more computer states.

There may be multiple modes to trigger the computer state setting triggers $132_1$, $132_2$ and $132_n$. For example, the detailed index display 130 may set a trigger button (such as $546_1$, $546_2$ and $546_3$) for each computer state in the display area A22. When the user clicks on the trigger button $546_1$, $546_2$ and $546_3$, a corresponding computer state setting trigger $132_1$, $132_2$ and $132_n$ will be triggered, thereby starting a corresponding computer state setter $140_1$, $140_2$ and $140_n$.

The detailed index display 130 may further comprise a display close interface 134 configured to receive a close instruction of the user to close the detailed index display 130. The detailed index display 130 may display a display close area A3 in its display area A2, and when the user clicks on the display close area A3, the display close interface 134 will close the detailed index display 130 and clear the display area A2.

Figure 6:
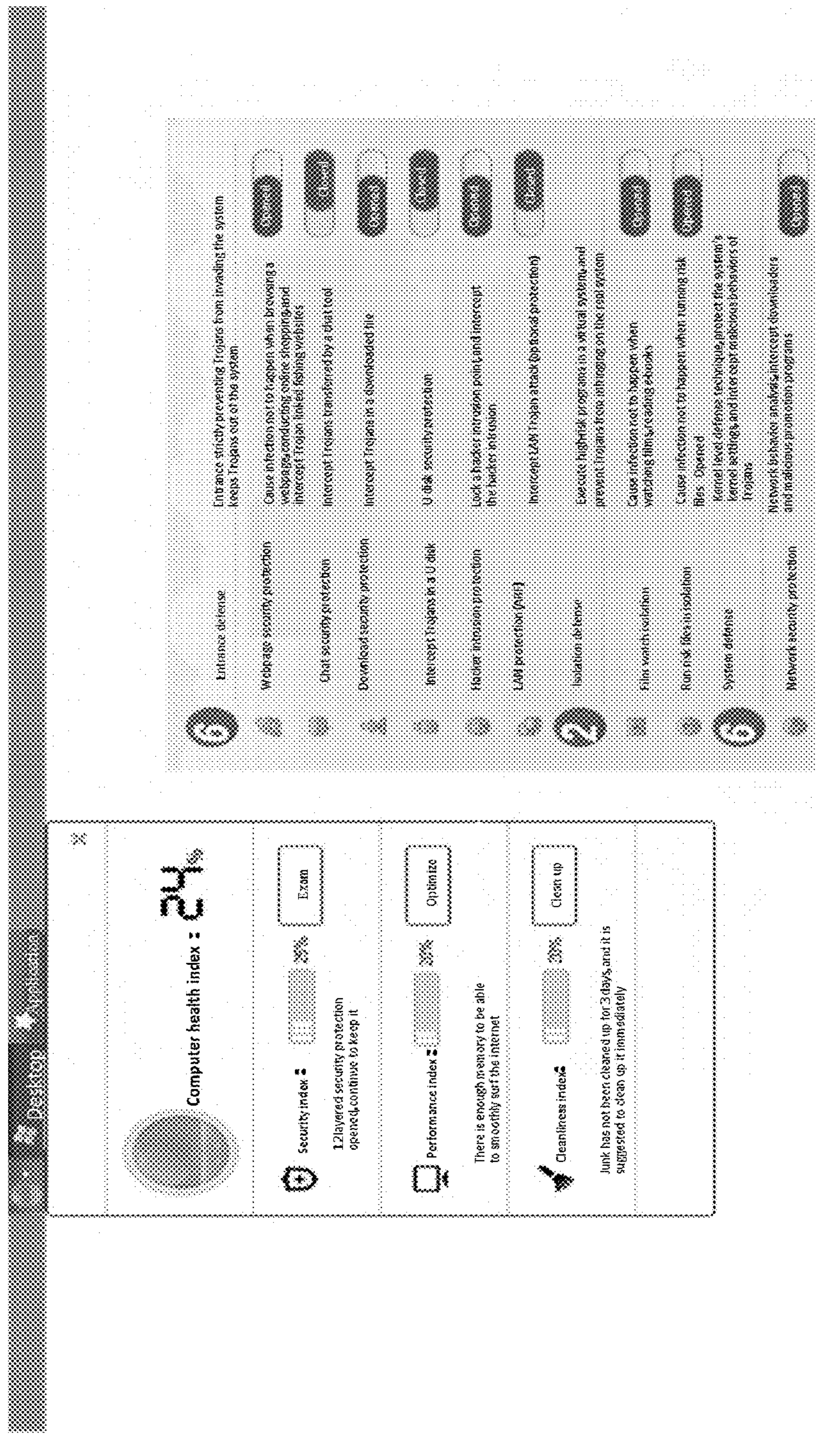
Figure 7:
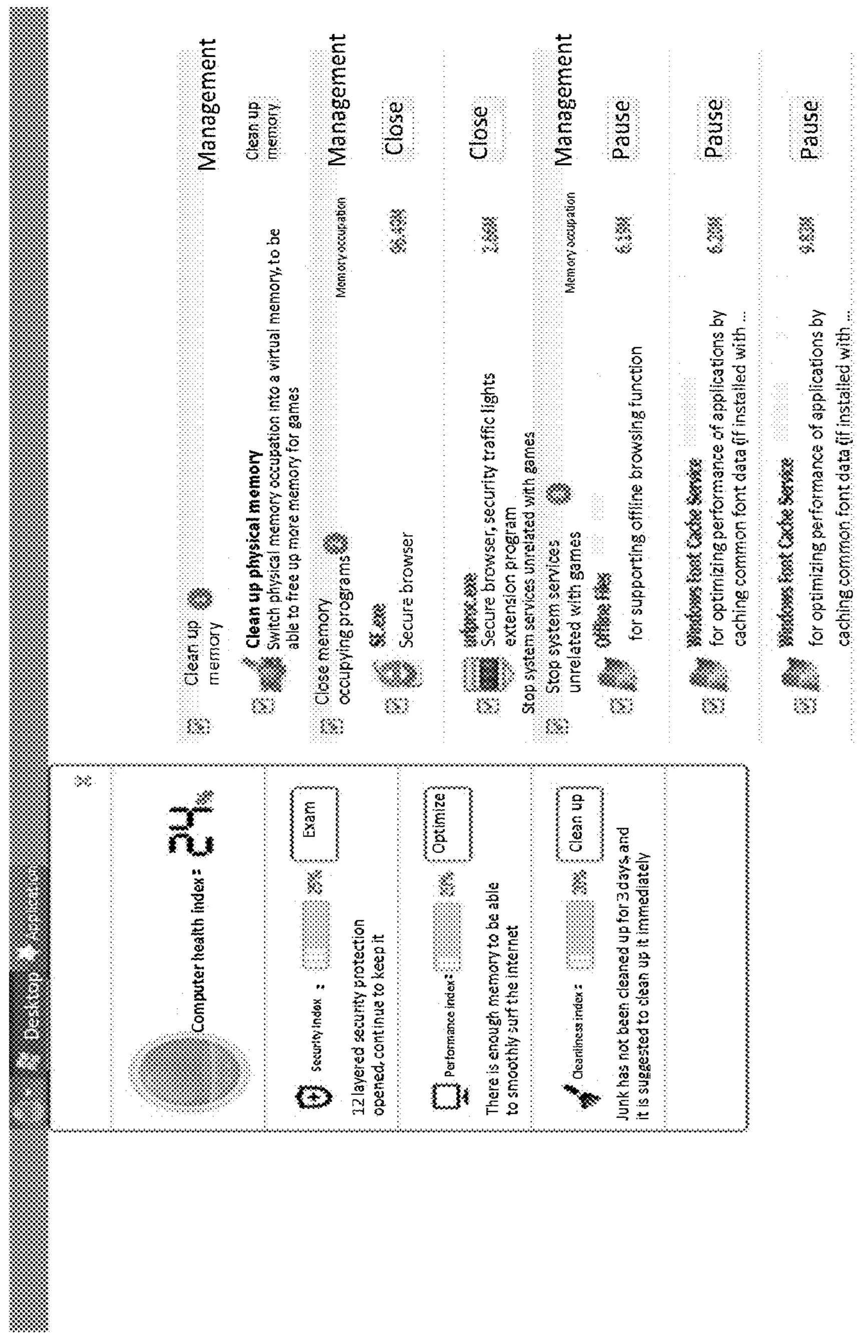
Figure 8:
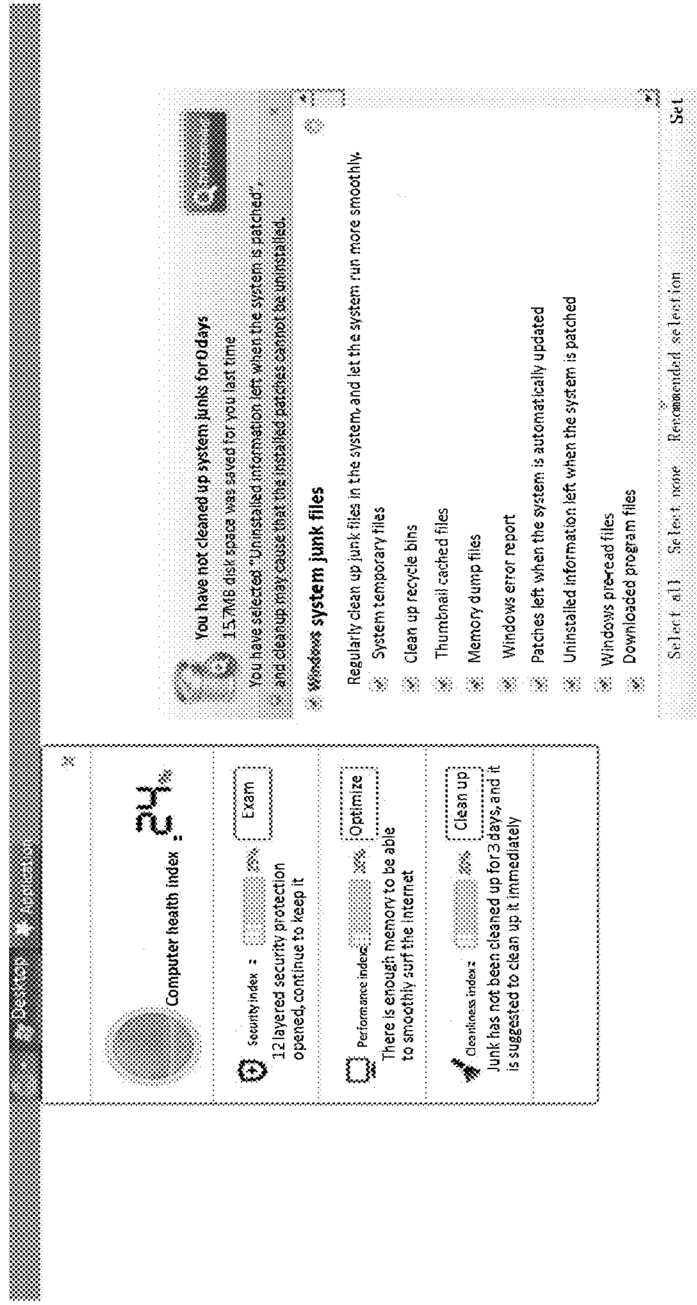

FIGS. 6-8 show respectively the displayed computer state setters $140_1$, $140_2$ and $140_n$ when the triggers 132 corresponding to the computer security firewall state, the computer performance state and the computer cleanup state are triggered, respectively. The user may set a corresponding computer state in a corresponding computer state setter, for example, the computer state setter $140_1$ shown in FIG. 6 is configured to open or close various computer protection settings, thereby set the computer security firewall state $150_1$; the computer state setter $140_2$ shown in FIG. 7 is configured to clean up the occupation of computer resources, thereby set the computer performance state $150_2$; and the computer state setter $140_3$ shown in FIG. 8 is configured to clean up junk files of the computer, thereby set the computer cleanup state $150_n$.

In general, after various computer states have been changed, the health index calculator 110 will re-calculate the various health sub-indices $I_1$, $I_2$ and $I_3$ and the computer health index I, and notify the simple index display 120 and the detailed index display 130. Subsequently, the simple index display 120 and the detailed index display 130 will update the corresponding display, such that the user may timely obtain corresponding information on the computer health state.

The apparatus for displaying the computer health index according to the disclosure will in general display a small icon on the computer desktop utilizing the simple index display, the appearance of the small icon will change with the computer health index, and such change of the small icon will draw a user's sufficient attention, such that the user may set the computer states upon focusing on the change of the small icon, to improve the health degrees of the computer states, thereby promoting the overall security of the computer.

In addition, in the apparatus for displaying the computer health index according to the disclosure, since the simple index display has a trigger to activate the detailed index display to display in greater detail the computer health index and each of the health sub-indices constituting the computer health index, upon focusing on the change of the small icon, the user may easily trigger a detailed index display by, for example, simply clicking an area located on or near the small icon, to display specific information on the computer health, such that it may be conveniently known which state(s) of the user's computer has or have a health problem(s), and setting may be performed for these states to improve the health degrees of the computer states, thereby further promoting the overall security of the computer.

Figure 9:
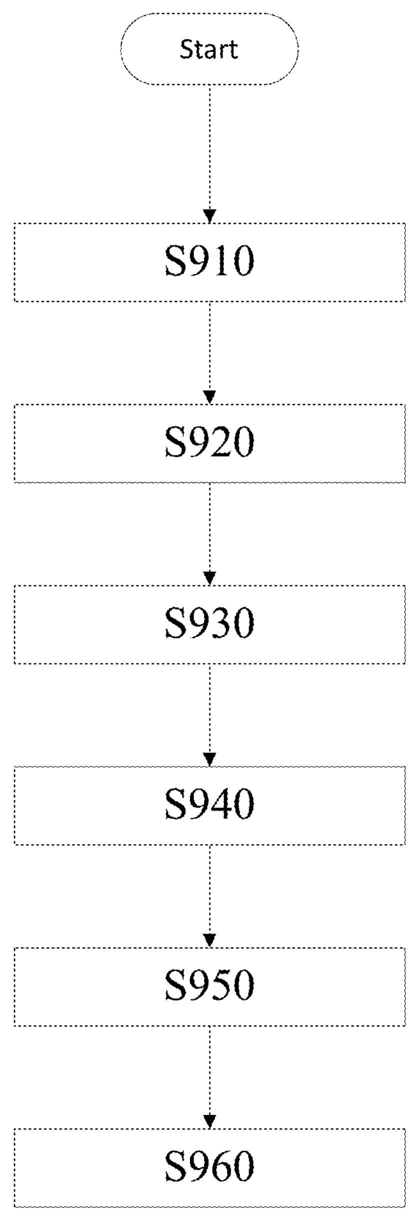
FIG. 9 shows schematically a flow chart of a computer health index display method according to an embodiment of the disclosure.

FIG. 9 shows schematically a flow chart of a method for displaying a computer health index display method 900 according to an embodiment of the disclosure, which method 900 may be carried out in the apparatus for displaying the computer health index according to the disclosure. As shown in FIG. 9, the method 900 starts at step S910, where a computer health index reflecting the overall health state of a computer is calculated. The overall health state of a computer is associated with one or more computer states of the computer itself. As an example, a computer state such as the security settings of the computer itself, the condition in which the computer resources are used, and how much junk files there are in the computer, and so on, reflects more or less the health state of the computer. Optionally, in step S910, it may be possible to classify individual states of the computer, set a health sub-index of a corresponding class for the computer states of each class, and totally calculate the computer health index based on the individual health sub-indices. The description in connection with the health index calculator 110 in the above has already described in detail how to calculate the computer health index, and will not be repeated here.

Next, in step S920, simple index display is done to display in a simple index display area a small icon reflecting a value of the computer health index. The appearance of the small icon may change with the value of the computer health index, thereby drawing the user's attention. For example, when the value of the computer health index is low, the small icon is displayed in a more prominent mode, whereas as the value of the computer health index becomes higher and higher, the display mode of the small icon will be increasingly soft. in the description in connection with FIGS. 2-4, the display mode of the small icon has already be described in detail, and will not be repeated here.

Optionally, the method 900 further comprises step S930, where a trigger region is set in the simple index display area, and if the user clicks on the trigger region, detailed index display will be triggered to display in a detailed index display area information on the computer health index I, as well as information on health sub-indices $I_1$, $I_2$ and $I_3$.

In general, as shown in FIG. 5, the detailed index display area A2 is adjacent to the simple index display area A1, and the display area A2 is much larger than A1, and A2 is generally shown under A1, such that when the detailed index display is triggered, the display of the display area A2 has the effect of a pop-up window.

The display area A2 may comprise two display sub-areas A21 and A22. In the display area A21, there is comprised information 530 on the computer health index I, whereas in the display area A22, there is comprised information $540_1$, $540_2$ and $540_3$ on a computer state associated with each health sub-index $I_1$, $I_2$ and $I_3$.

When the information 530 on the computer health index I is displayed in step S930, a large icon 530 reflecting the value of the computer health index and the value 534 of the computer health index may be displayed. The display mode of the large icon 532 may be similar to that of the small icon, and the difference may lie in that the size of the large icon 532 will be clearly larger than that of the small icon.

In step S930, when information $\mathbf{540}_1$, $\mathbf{540}_2$ and $\mathbf{540}_3$ on a computer state associated with each health sub-index $I_1$, $I_2$ and $I_3$ is displayed, the information $\mathbf{542}_1$, $\mathbf{542}_2$ and $\mathbf{542}_3$ on the computer state associated with each health sub-index $I_1$, $I_2$ and $I_3$, as well as the information $\mathbf{544}_1$, $\mathbf{544}_2$ and $\mathbf{544}_3$ on the values of the health sub-indices may be displayed.

In the above, the content of detailed index display has already been described in detail in connection with FIG. 5, and will not be repeated here.

Optionally, in step S930, a computer state setting trigger area is further displayed in the detailed index display area. Therefore, when the user triggers on the computer state setting trigger area in step S940, a corresponding computer state setter is started to set one or more computer states.

Optionally, the method 900 further comprises step S950, where when the computer states have been changed, the health sub-indices are re-calculated, and the computer health index is re-calculated.

Optionally, in step S930, a display close area is further displayed in the detailed index display area. Therefore, in step S960, when the user clicks on the display close area, a close instruction of the user is received to clear the displayed content in step S930.

It should be noted that, in the individual components of the display apparatus of the disclosure, the components therein are divided logically according to the functionality to be realized by them, however, the disclosure is not limited thereto, and the individual components may be re-divided or combined as needed, for example, some components may be combined into a single component, or some components may be further decomposed into more sub-components.

Embodiments of the individual components of the invention may be implemented in hardware, or in a software module running on one or more processors, or in a combination thereof. It will be appreciated by those skilled in the art that, in practice, some or all of the functions of some or all of the components in the apparatus for displaying the computer health index according to individual embodiments of the invention may be realized using a microprocessor or a digital signal processor (DSP). The invention may also be implemented as an apparatus or device program (e.g., a computer program and a computer program product) for carrying out a part or all of the method as described herein. Such a program implementing the invention may be stored on a computer readable medium, or may be in the form of one or more signals. Such a signal may be obtained by downloading it from an Internet website, or provided on a carrier signal, or provided in any other form.

Figure 10:
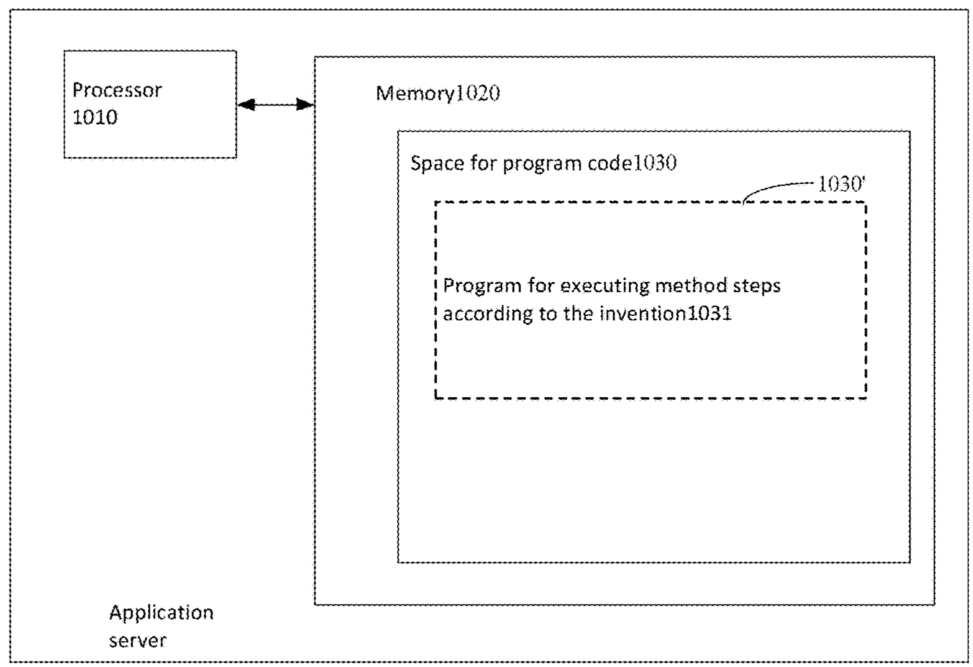
FIG. 10 shows schematically a block diagram of a server for performing a method according to the disclosure.
Figure 11:
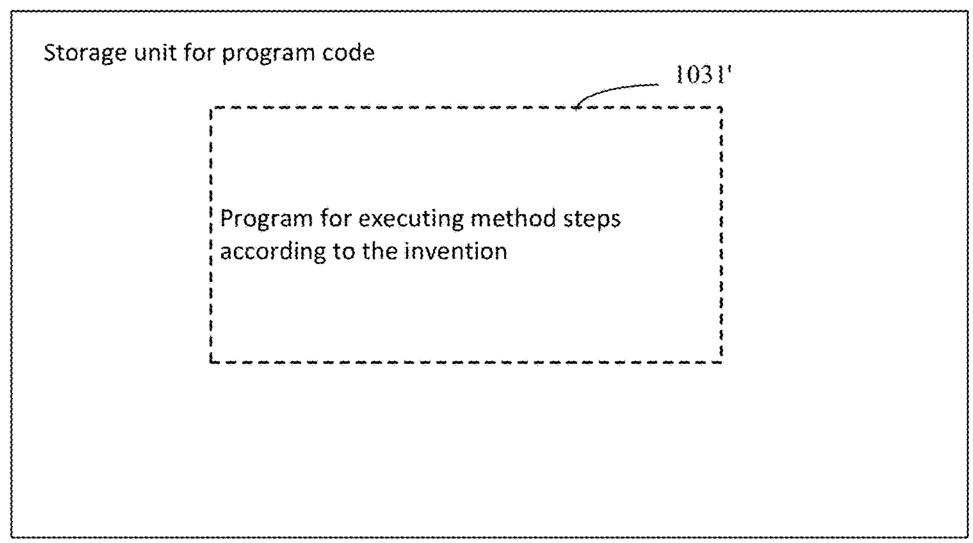
FIG. 11 shows schematically a storage unit for retaining or carrying a program code implementing a method according to the disclosure.

For example, FIG. 10 shows a server which may carry out a method for displaying the computer health index according to the disclosure, e.g., an application server. The server traditionally comprises a processor 1010 and a computer program product or a computer readable medium in the form of a memory 1020. The memory 1020 may be an electronic memory such as a flash memory, an EEPROM (electrically erasable programmable read-only memory), an EPROM, a hard disk or a ROM. The memory 1020 has a memory space 1030 for a program code 1031 for carrying out any method steps in the methods as described above. For example, the memory space 1030 for a program code may comprise individual program codes 1031 for carrying out individual steps in the above methods, respectively. The program codes may be read out from or written to one or more computer program products. These computer program products comprise such a program code carrier as a hard disk, a compact disk (CD), a memory card or a floppy disk. Such a computer program product is generally a portable or stationary storage unit as described with reference to FIG. 11. The storage unit may have a memory segment, a memory space, etc. arranged similarly to the memory 1020 in the server of FIG. 10. The program code may for example be compressed in an appropriate form. In general, the storage unit comprises a computer readable code 1031', i.e., a code which may be read by e.g., a processor such as 1010, and when run by a server, the codes cause the server to carry out individual steps in the methods described above.

"An embodiment", "the embodiment" or "one or more embodiments" mentioned herein implies that a particular feature, structure or characteristic described in connection with an embodiment is included in at least one embodiment of the invention. In addition, it is to be noted that, examples of a phrase "in an embodiment" herein do not necessarily all refer to one and the same embodiment.

In the specification provided herein, a plenty of particular details are described. However, it can be appreciated that an embodiment of the invention may be practiced without these particular details. In some embodiments, well known methods, structures and technologies are not illustrated in detail so as not to obscure the understanding of the specification.

It is to be noted that the above embodiments illustrate rather than limit the invention, and those skilled in the art may design alternative embodiments without departing the scope of the appended claims. In the claims, any reference sign placed between the parentheses shall not be construed as limiting to a claim. The word "comprise" does not exclude the presence of an element or a step not listed in a claim. The word "a" or "an" preceding an element does not exclude the presence of a plurality of such elements. The invention may be implemented by means of a hardware comprising several distinct elements and by means of a suitably programmed computer. In a unit claim enumerating several apparatuses, several of the apparatuses may be embodied by one and the same hardware item. Use of the words first, second, and third, etc. does not mean any ordering. Such words may be construed as naming.

Furthermore, it is also to be noted that the language used in the description is selected mainly for the purpose of readability and teaching, but not selected for explaining or defining the subject matter of the invention. Therefore, for those of ordinary skills in the art, many modifications and variations are apparent without departing the scope and spirit of the appended claims. For the scope of the invention, the disclosure of the invention is illustrative, but not limiting, and the scope of the invention is defined by the appended claims.

What is claimed is:

1. An apparatus for displaying a computer health index, comprising:

a memory having instructions stored thereon;

a processor to execute the instructions to perform operations comprising:

calculating at least one health sub-index and calculating the computer health index based on the at least one health sub-index, wherein each of the at least one health sub-index is associated with at least one computer state, and each of the at least one health sub-index reflects a health degree of an associated computer state;

performing simple index display in a specific area on a desktop to display a first icon reflecting a value of the computer health index;

wherein the first icon displayed by the simple index display is a first sphere, the first sphere changes its shape with the value of the computer health index, a color filled the first sphere changes from red to green or vice versa based on the value of the computer health index, and when the value of the computer health index is 100%, the first icon displayed by the simple index display becomes a fixed icon;

triggering by a user, the specific area on the desktop to display a detailed index display area, the detailed index display area containing:

a second icon reflecting the value of the computer health index, the second icon is a second sphere and is larger than the first icon, and a color filled the second sphere changes from red to green or vice versa based on the value of the computer health index;

information of the computer health index and information of each of the at least one health sub-index;

a computer state setting trigger area for receiving at least one trigger command from the user when the user clicks on the computer state setting trigger area; and updating the first and second icons to reflect the at least one trigger command received from the user.

2. The apparatus for displaying the computer health index as claimed in claim 1, wherein the detailed index display area comprises information of each of the at least one computer state associated with each of the at least one health sub-index and information of a value of each of the at least one health sub-index.

3. The apparatus for displaying the computer health index as claimed in claim 1, wherein the at least one computer state comprises at least one of a computer security protection state, a computer performance state, and a computer cleanup state.

4. The apparatus for displaying the computer health index as claimed in claim 1, wherein the computer health index is calculated by performing weighted summation of the at least one health sub-index.

5. The apparatus for displaying the computer health index as claimed in claim 1, wherein the operations further comprise: receiving a close instruction of a user to close contents displayed by the simple index display.

6. The apparatus for displaying the computer health index as claimed in claim 1, wherein the simple index display further displays a detailed display trigger area for receiving a trigger command of a user; and the detailed display trigger area of the simple index display is triggered when a user clicks on the detailed display trigger area.

7. A method for displaying a computer health index, comprising:

calculating, by at least one processor, at least one health sub-index and the computer health index based on the at least one health sub-index, wherein each of the at least one health sub-index is associated with at least one computer state, and each of the at least one health sub-index reflects a health degree of an associated computer state;

performing, by the at least one processor, simple index display in a specific area on a desktop to display a first icon reflecting a value of the computer health index, wherein the first icon displayed by the simple index display is a first sphere, the first sphere changes its shape with the value of the computer health index, a color filled the first sphere changes from red to green or vice versa based on the value of the computer health index, and when the value of the computer health index is 100%, the first icon displayed by the simple index display becomes a fixed icon;

triggering by a user, the specific area on the desktop to display a detailed index display area, the detailed index display area containing:

a second icon reflecting the value of the computer health index, the second icon is a second sphere and is larger than the first icon, and a color filled the second sphere changes from red to green or vice versa based on the value of the computer health index;

information of the computer health index and information of each of the at least one health sub-index;

a computer state setting trigger area for receiving at least one trigger command from the user when the user clicks on the computer state setting trigger area; and updating the first and second icons to reflect the at least one trigger command received from the user.

8. The method for displaying the computer health index as claimed in claim 7, wherein:

the detailed index display area comprises information of each of the at least one computer state associated with each of the at least one health sub-index and information of a value of each of the at least one health sub-index.

9. The method for displaying the computer health index as claimed in claim 7, wherein the at least one computer state comprises at least one of a computer security protection state, a computer performance state, and a computer cleanup state.

10. The method for displaying the computer health index as claimed in claim 7, wherein the computer health index is calculated by performing weighted summation of the at least one health sub-index.

11. A non-transitory computer readable medium having instructions stored thereon that, when executed by at least one processor, cause the at least one processor to perform operations for displaying a computer health index, the operations comprising:

calculating at least one health sub-index and calculating the computer health index based on the at least one health sub-index, wherein each of the at least one health sub-index is associated with at least one computer state, and each of the at least one health sub-index reflects a health degree of an associated computer state;

performing simple index display in a specific area on a desktop to display a first icon reflecting a value of the computer health index, wherein the first icon displayed by the simple index display is a first sphere, the first sphere changes its shape with the value of the computer health index, a color filled the first sphere changes from red to green or vice versa based on the value of the computer health index, and when the value of the computer health index is 100%, the first icon displayed by the simple index display becomes a fixed icon;

triggering by a user, the specific area on the desktop to display a detailed index display area, the detailed index display area containing:

a second icon reflecting the value of the computer health index, the second icon is a second sphere and is larger than the first icon, and a color filled the second sphere changes from red to green or vice versa based on the value of the computer health index;

information of the computer health index and information of each of the at least one health sub-index;

a computer state setting trigger area for receiving at least one trigger command from the user when the user clicks on the computer state setting trigger area; and updating the first and second icons to reflect the at least one trigger command received from the user.

* * * * *